United States Patent
Bhattacharyya et al.

(10) Patent No.: US 7,908,655 B1
(45) Date of Patent: Mar. 15, 2011

(54) CONNECTIONLESS PORT SCAN DETECTION ON A NETWORK

(75) Inventors: Supratik Bhattacharyya, San Francisco, CA (US); Avinash Sridharan, Ghathkpar (IN); Tao Ye, Daily City, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1196 days.

(21) Appl. No.: 11/204,821

(22) Filed: Aug. 16, 2005

(51) Int. Cl.
*H04L 29/00* (2006.01)

(52) U.S. Cl. ........... 726/22; 370/388; 370/390; 370/392; 370/396

(58) Field of Classification Search .................. 709/224; 726/23; 370/388, 390, 396, 398
See application file for complete search history.

(56) References Cited

U.S. PATENT DOCUMENTS

| | | | |
|---|---|---|---|
| 7,500,266 B1* | 3/2009 | Vukelich et al. | 726/23 |
| 2003/0105976 A1* | 6/2003 | Copeland, III | 713/201 |
| 2004/0117478 A1* | 6/2004 | Triulzi et al. | 709/224 |

* cited by examiner

*Primary Examiner* — Vivek Srivastava
*Assistant Examiner* — Thong Truong

(57) ABSTRACT

A system and a method for detecting port scanning activities on a computer network. A probability variable is assigned to a device on a computer network. The probability variable indicates the probability that the device is conducting port-scanning activities. Data describing transmissions by the device during multiple intervals of time is accessed, and, for each of the time intervals, a determination is made concerning whether or not the device conducted port-scanning activities. Based on these determinations, the probability variable is updated for each of the time intervals.

17 Claims, 4 Drawing Sheets

CONNECTIONLESS PORT SCAN DETECTION ON A NETWORK

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The spread of malicious, self-propagating code, popularly known as worms, continues to pose a grave threat to the security of the Internet. These worms exploit software vulnerabilities on certain service ports to compromise end-hosts and to install malicious code on the hosts. Subsequently, the compromised hosts may be used to launch a wide-range of malicious activities such as launching denial of service attacks and sending spam emails.

Stopping the propagation of these worms is a daunting task. Once a new software vulnerability is discovered, new worms exploiting the vulnerability appear in rapid succession and spread throughout the Internet in a matter of hours. Further, even when a vulnerability is known, it is infeasible to ensure that the millions of hosts on the Internet are all properly configured and patched so as to provide security against the known vulnerabilities.

With the speed of worm promulgation and the vast number of computers on the Internet, worm containment strategies often seek to limit the spread of worms at an early stage of propagation. Typically, the spread of a worm is preceded by a reconnaissance phase where infected hosts scan for new hosts that are vulnerable. This scanning activity (known as port scanning) takes the form of probe packets targeted at specific ports on target hosts. If the target host responds, then the scanner may initiate the process of uploading the malicious code onto the target host.

A variety of techniques currently exist for port scan detection. However, the current methods are not acceptable for use on large or transit networks. Indeed, port scan detection algorithms today generally operate at the point of entry into a stub network (e.g., an enterprise network or a campus network). For example, the SNORT algorithm is a popular port scan detection algorithm. This algorithm marks a source IP address as a scanner if it contacts more than K distinct IP addresses within T seconds. While SNORT is widely used for enterprise-level networks, it has been shown to be inadequate for use with the traffic mix typically found in a large transit network. In such an environment, application of the SNORT algorithm often yields a large number of false positive results. Another exemplary algorithm is the Threshold Random Walk (TRW) algorithm. This algorithm assumes a bi-directional view of traffic and complete knowledge of the configuration of all end-hosts (e.g., as with an enterprise-level network). Of course, such information is not readily available in a transit network. Accordingly, there is a need for improved systems and methods for detecting port scanning behavior on a network.

SUMMARY

The present invention meets the above needs and overcomes one or more deficiencies in the prior art by providing systems and methods for determining whether a device on a computer network is port scanning. In one aspect of an embodiment of the present invention, a computer-implemented method is provided. A probability variable is assigned to a selected device on the network. The probability variable indicates the probability that the device is conducting port-scanning activities. Data describing transmissions by the device during multiple intervals of time is accessed, and, for each of the time intervals, a determination is made concerning whether or not the device conducted port-scanning activities. Based on these determinations, the probability variable is updated for each of the time intervals.

Another aspect of an embodiment of the present invention includes a system for identifying devices operating on a transit network that exhibit behaviors of a port scanner. The system includes a behavior analysis component configured to generate behavior analysis indicating whether or not devices on the transit network exhibited behavioral characteristics of a port scanner during each time periods. A probability tracking component is also included in the system. This component is configured to receive the behavior analysis and, for each of the time periods, to iteratively update a port scanner probability variable associated with each of the devices.

A further aspect of an embodiment of the present invention includes a computerized method. A probability variable is assigning to a selected source device on a network. For each of multiple time periods, information describing transmissions from the device is evaluated, and transmission characteristics are identified. The transmission characteristics are compared to behavioral properties that indicate port-scanning activities, and the results of this comparison are utilized to update the probability variable.

BRIEF DESCRIPTION OF THE SEVERAL VIEWS OF THE DRAWING

The present invention is described in detail below with reference to the attached drawing figures, wherein.

DETAILED DESCRIPTION

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The present invention provides an improved system and method for determining whether a device on a network is port scanning. The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including handheld devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

Figure 1:
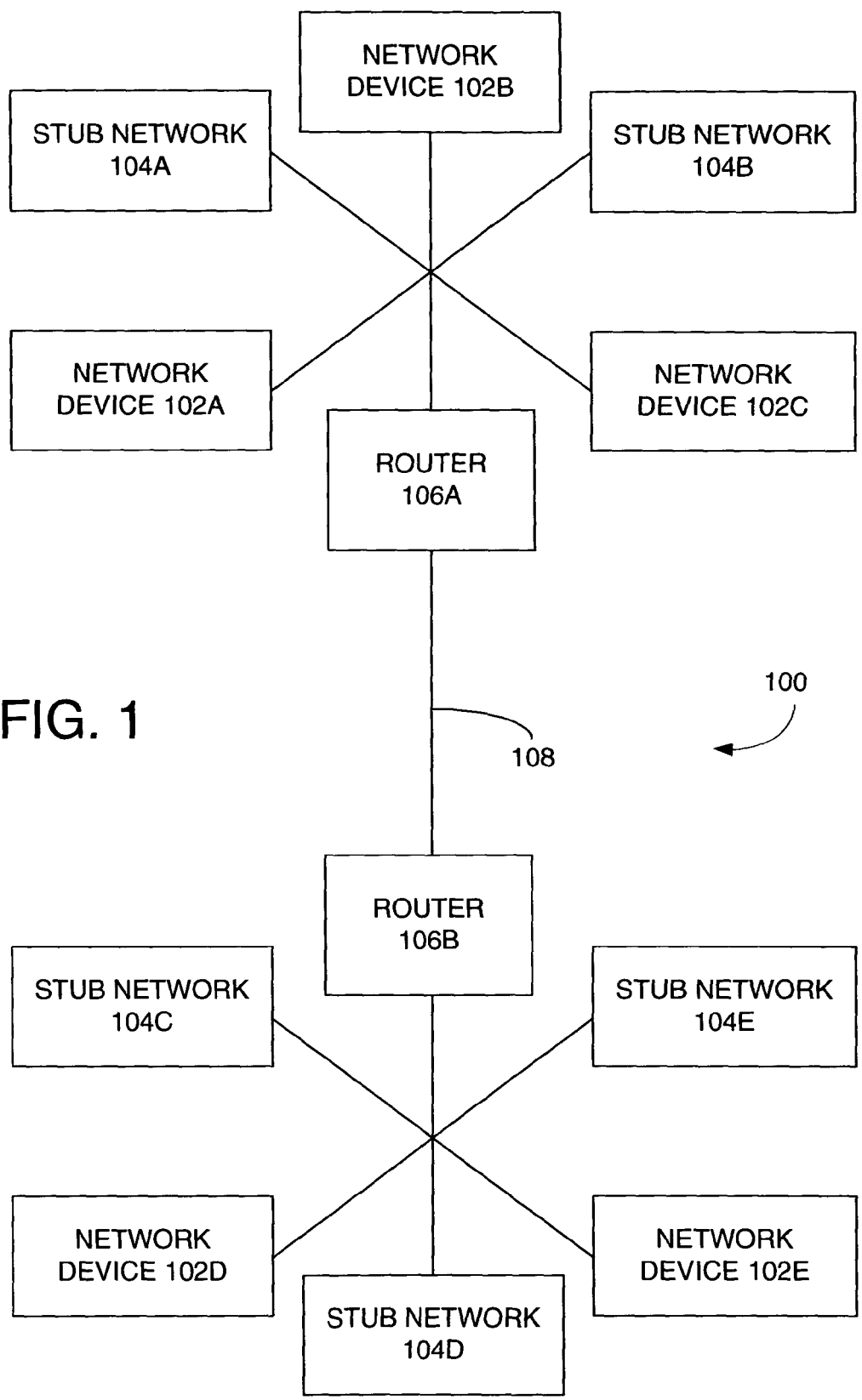
FIG. 1 is a block diagram of a network environment suitable for use in implementing the present invention.

FIG. 1 illustrates a network 100 that represents an exemplary environment in which the present invention may be practiced. The system 100 includes network devices 102A-102E (collectively hereinafter, the network devices 102). The network devices 102 may be any devices capable of accessing the network 100 and communicating with the network 100. For example, a portion of the network devices 102 may be computers with network interface capabilities. The system 100 further includes stub networks 104A-104E (collectively hereinafter, the stub networks 104). A stub networks is any networks that carry packets to and from devices on that network, and the stub networks 104 may be, for example, private enterprise networks. In one embodiment, the stub networks 104 do not carry traffic for other networks, and the stub networks 104 rely on other elements of the network 100 to transport packets among the various stub networks 104 and the network devices 102

The system 100 also includes a router 106A and a router 106B (collectively hereinafter, the routers 106) that are connected by a link 108. As will be appreciated by those skilled in the art, the link 108 may be considered the backbone of the network 100. The routers 106 may be any routing devices capable of receiving transmitted packets and routing them on to a desired destination. For example, the network device 102A may transmit a group of packets to the network device 102D. These transmitted packets may be received by the router 106A, and the router 106A may cause the packets to traverse the link 108. After receipt by the router 108B, the packets may be delivered to the network device 102D.

Because the network 100 passes traffic between the stub networks 104 in addition to carrying traffic for the network devices 102A, the network 100 may be considered a transit network. As will be appreciated by those skilled in the art, a transit network may carry a very diverse traffic mix. Further, the provider of the network 100 may have minimal knowledge concerning the devices in the stub networks 104 or the traffic being transported on the link 108. Because the link 108 transports data between the stub networks 104, there is limited ability for the transit network provider to discern information about the source or destination of the traffic.

It is important to note that network systems in which the present invention may operate may be arranged in a variety of configurations, and the network 100 of FIG. 1 provides only one exemplary network environment. The network 100 may be a Tier 1 ISP network that provides transit services to smaller ISP networks and to enterprise networks. For a further example, additional routers may be connected to the routers 106 by additional links. Of course, more stub networks and network devices may be interconnected with each of these additional routers. Also, the present invention may be implemented in a network environment that has multiple backbones. As such, the backbone will not provide a central point of observation for all traffic on the network. In fact, the routing policies of a network may leads to asymmetric routing which yields a unidirectional view of traffic at a given observation point.

While the present invention may detect port scanning on a variety of networks including transit and stub networks, there are several important differences between detecting port scans in a transit network and in a stub network. First, link speeds at the core of a transit network are much higher (e.g., 10 Gbps) than at where it connects to a stub network. A transit network also sees a wider diversity of IP addresses, potentially generating a much larger amount of data that needs to be stored and accessed by a detection algorithm. Additionally, when detecting port scans in a transit network, the detection algorithm cannot rely on knowledge about the configuration of end-hosts or the topology of the network.

Figure 2:
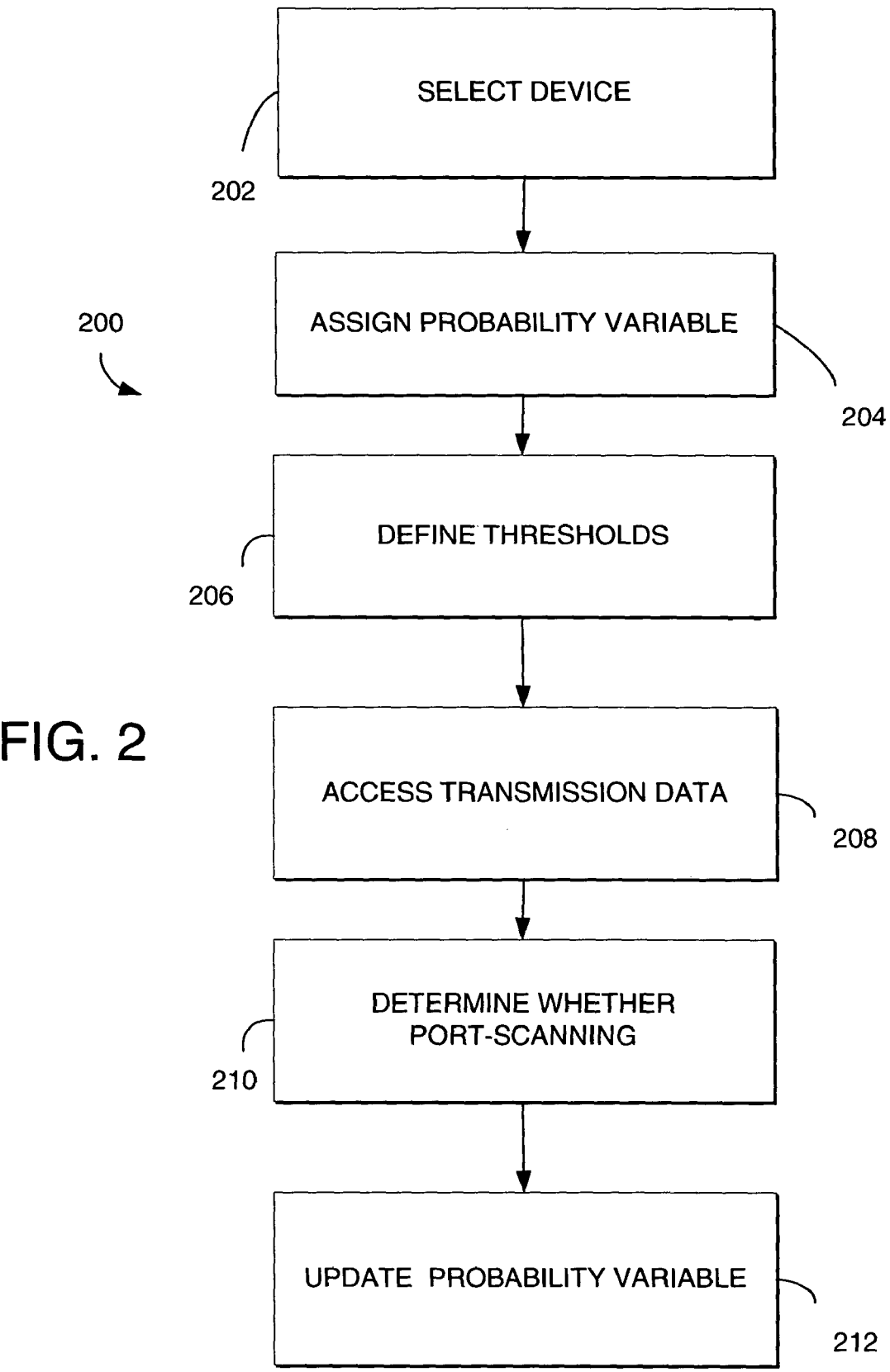
FIG. 2 illustrates a method in accordance with the present invention for determining whether a device on a computer network is port scanning.

FIG. 2 illustrates a method 200 for determining whether a device on a computer network is port scanning. At a step 202, the method 200 selects a device on a network that is the source of one or more transmissions over that network. The device may be selected with any number of selection techniques or criteria. For example, a network link may be tapped by a packet sniffer capable of reading information from the various transmissions traversing the link. Such a packet-sniffing device is well known in the art. The information read from the packets may indicate the source of a transmission, such as the IP address of a source device. Accordingly, a source device may be selected by identifying its source IP address. In one embodiment, only devices exhibiting suspicious behaviors indicating port scanning are selected by the method 200.

At a step 204, a probability variable is assigned to the selected device. The probability variable indicates the probability that the device is conducting port-scanning activities. In one embodiment, the probability variable is initially given a default value. As will be explained, the probability variable is revised throughout the performance of the method 200, so a default initial value may be assigned to this variable. However, the initial value may also be tailored based on observed characteristics of the device. For example, in selecting the device, suspicious behavior may have been observed. The initial probability variable may be increased to reflect this suspicious behavior. To this end, historical data may be referenced to determine an appropriate initial value for the probability variable.

The method 200, at a step 206, defines a set of thresholds for use in evaluating potential port scanning behavior. These thresholds may provide a quantifiable measure to determine whether a device is exhibiting behaviors of a port-scanning device. For example, a port scanner generally attempts one of two distinct access patterns to find vulnerable hosts. The first, a vertical access pattern, is accomplished by trying to connect to multiple ports on each of a limited number of devices. For example, a scanner may attempt to access 15 different ports on every device it attempts to access. Expressing this access pattern mathematically, if the ratio of the number of ports attempted by a source to the number of destination addresses is much greater than 1, then the device appears to be vertically port scanning. Accordingly, if this vertical port-scanning ratio is above a defined threshold value (i.e. a number much greater than 1), then vertical port scanning will be indicated. The second access pattern, horizontal scanning, occurs when a device attempts to connect to a small number of ports on a large number of computers. For example, a device may attempt to connect to a single port on each of 1000 different destinations. Accordingly, if the ratio of the number of attempted destinations verses the number of attempted ports is greater than a threshold value (i.e. a number much greater than one) than horizontal scanning may be suspected. Those skilled in the art will recognize that any number of threshold values may indicate port-scanning behaviors and that historical data from known port scanners may be used to appropriately set such values. Thus, the present invention may incorporate any number of threshold values indicating port-scanning behavior.

At a step 208, the method 200 accesses transmission data for the selected device. The transmission data may indicate each transmission made by the device during an interval of time. For example, a packet sniffer may detect each packet emanating from a source IP address during the time interval. The packet sniffer may also gather other information necessary to describe the transmissions such as destination addresses and destination ports. In one embodiment, the transmission data provides enough information to determine whether the selected device exceeded the various thresholds associated with port scanning behavior during the time interval. It should be noted that the method 200 does not require any data derived from knowledge of network configurations. Also, the method 200 does not require data based on a bi-directional view of traffic or knowledge that a connection attempt failed or succeeded. As will be appreciated by these skilled in the art, because the method 200 does not require knowledge of network configurations or a bi-directional view of traffic, the method 200 may be appropriate for use with a backbone network. Further, the method 200 is protocol agnostic in that it does not monitor connections such as TCP connections. Accordingly, the method 200 may be used, for example, with both TCP and UDP protocols.

The method 200 determines whether the selected device conducted port-scanning activities during the time interval at a step 210. A comparison of the transmission data to the threshold values may allow this determination to be made. For example, if the transmission data indicates a horizontal scanning ratio that is higher than the horizontal scanning threshold value (i.e. the device attempted to access many addresses per port), then it may be determined that the device was port scanning during that time interval. As previously mentioned, the threshold values may be used to define the bounds of scanning behavior and any number of threshold values may be considered by the present invention.

In one embodiment, the method 200 applies a sequential hypothesis test to determine if the device is conducting scanning activities. Such sequential hypothesis testing is well known in the art. A sequential hypothesis test is a series of updates on the probability variable, given a series of events in sequence to determine which of two possible sets $H_0$ or $H_1$ the entity belongs. In the present invention, $H_0$ is the set of benign hosts and $H_1$ is the set of scanners, while the entity is the network device in question.

The probability variable is updated whenever an event occurs. The method 200 uses time intervals (or time bins) as an event generation mechanism, e.g. every N seconds the method 200 determines whether port-scanning behavior occurred for the device and updates the probability variable. An event may be represented by an indicator random variable Y, such that for event i, $Y_i$ is equal to 0 if event i is successful and 1 if the event i is not successful. In the present invention, an event i is successful if the device behaved like a scanner during the time frame i. If k is a threshold value associated with the previously discussed vertical and horizontal access pattern ratios, then $Y_i$ may be defined as 0 if both ratios fall below the k threshold during the time interval i, i.e., neither vertical or horizontal access patterns were implemented by the device. However, if either ratio exceeds k, then scanning activity is detected and $Y_i$ is set to 1. In one embodiment, whenever an event occurs, the sequential hypothesis testing updates the probability variable defined as follows:

$$\Lambda(Y) = \prod_{i=1}^{n} \frac{Pr[Y_i \mid H_1]}{Pr[Y_i \mid H_0]}$$

For the sequential hypothesis test to be successful it is important that there be a clear demarcation in the statistical behavior of the two sets $H_0$ and $H_1$. As the entity walks through the series of events, a stop condition may occur when $\Lambda(Y)$ crosses one of two thresholds $\eta_0$ and $\eta_1$. If $\Lambda(Y) > \eta_1$ then the test declares the entity in set $H_1$ (a scanner), and if $\Lambda(Y) < \eta_0$ the entity is placed in set $H_0$ (a benign device).

At a step 212, the method 200 updates the probability variable based on the behavior of the device during the time interval. For example, if the device exhibited scanner properties, then the probability variable is increased to indicate a heightened chance that the device is a scanner. At a step 214, the method determines whether a stop condition has been achieved. The stop condition may be a number of iterations or may reference the value of the probability variable. For instance, a stop condition may specify a certain probability where it may be concluded that the device is a scanner. Alternately, if the probability variable falls below a lower probability limit, it may be determined that the device is not a scanner (i.e. a benign element). If a stop condition is satisfied, then the method 200 no longer considers the selected device. However, if no stop condition is triggered, the method 200 accesses transmission data for a next time interval at a step 216. The method 200 then repeats the steps 210 and 212 until a stop condition is satisfied. By repeating these steps, the probability variable is refined over multiple time intervals. Of course, the probability variable maintains history from previous time frames to provide a description of the device based on all considered time frames.

Figure 3:
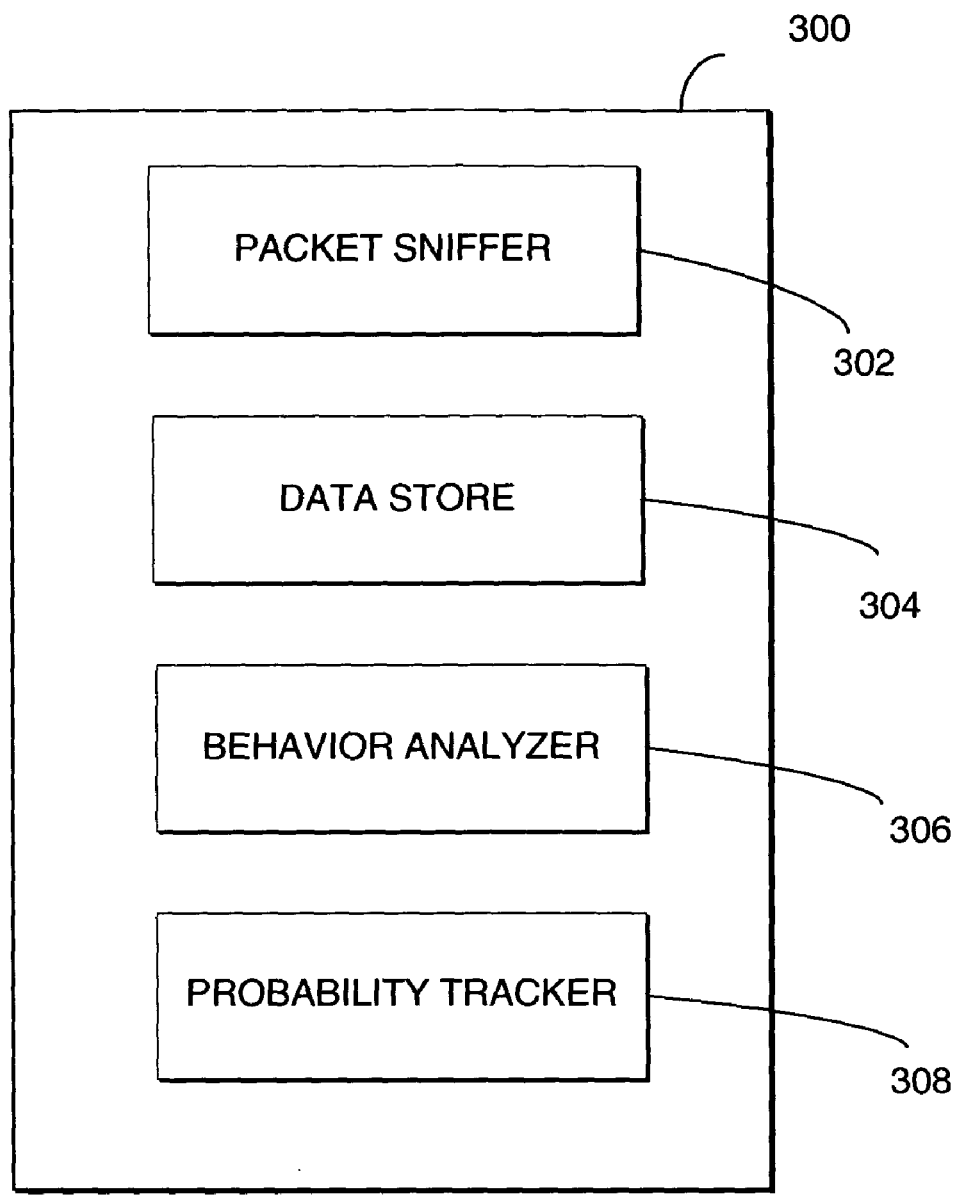
FIG. 3 is a schematic diagram representing a system in accordance with the present invention for identifying port scanners operating on a network.

FIG. 3 illustrates a system 300 for identifying devices that exhibit behaviors of port scanners. The system 300 includes a packet sniffer 302. A packet sniffer 302 is a device that is able to access a network link and see traffic passing across the link. Any variety of packet sniffers 302 known in the art may be acceptable for use with the present invention, and the packet sniffer 302 may tap a link such as link 108 of the network 100 shown on FIG. 1. As data travels over a network link, the packet sniffer 302 may capture packets and decode information such as the packets' headers. This information may indicate the source IP address and port of a packet, as well as its destination IP address and port. Further, the packet sniffer 302 may be used to sniff all or a portion of the traffic from a single device on the network.

The system 300 also includes a data store 304 configured to store information received from the packet sniffer 302. The data store 304 may be any storage media, and the data may be arranged in a variety of different formats. For example, the data may be indexed such that each transmission from a particular source IP address can be identified and/or sorted by a time indicia.

A behavior analyzer component 306 is included in the system 300. The behavior analyzer component 306 may be configured to access the data in the data store 304 and to analyze the behavior of a network device during a period of time. For example, the behavior analyzer component 306 may be configured to determine whether a device exhibited one or more behavioral characteristics of a port scanner during the time period. As previously discussed, such a determination may rely on a set of thresholds that quantifiably define port-scanning behaviors. Those skilled in the art will recognize that any number of threshold values may indicate port-scanning behaviors and that the present invention may incorporate any number of these threshold values. For instance, the behavior analyzer component 306 may obtain data describing each transmission from a source IP address during the time period. Using this data, the previously discussed vertical and horizontal access pattern ratios may be computed and compared to the thresholds. If either ratio exceeds the threshold, the behavior analyzer component 306 may determine that the source device was exhibiting port-scanning behavior during that period of time.

The system 300 further includes a probability tracking component 308 that is configured to receive the behavior analysis from the behavior analyzer component 306. In one embodiment, the probability tracking component 308 maintains a listing of devices (or IP addresses) that may be conducting port scanning operations. Along with this listing, a probability variable is maintained for each device. This probability variable indicates the likelihood that a device is a port scanner. The probability tracking component 308 may include an update mechanism to iteratively update the probability variable associated with the devices. After each time period analyzed by the behavior analyzer component 306, the probability tracking component 308 may receive an indication of which devices behaved like scanners during the time period and which devices behaved like benign or non-scanning devices. Based on this information, the probability variables may be updated. When a device acted like a scanner, the probability variable is increased. Alternatively, the variable is decreased when a device did not exhibit scanner properties. Those skilled in the art will recognize that any number of update mechanisms may be used to update the probability variable and that sequential hypothesis testing may be used as part of the update operations. After updating a probability variable, the probability tracking component 308 may determine whether the probability variable has reached a level where it may be concluded that the associated source device is a scanner. For example, the probability tracking component 308 may conclude that each device with an associated probability variable above 97% is a scanner. With such devices, additional analysis may not be necessary. Similarly, if a probability variable falls below 10%, the device may be deemed benign and no longer be evaluated.

Figure 4:
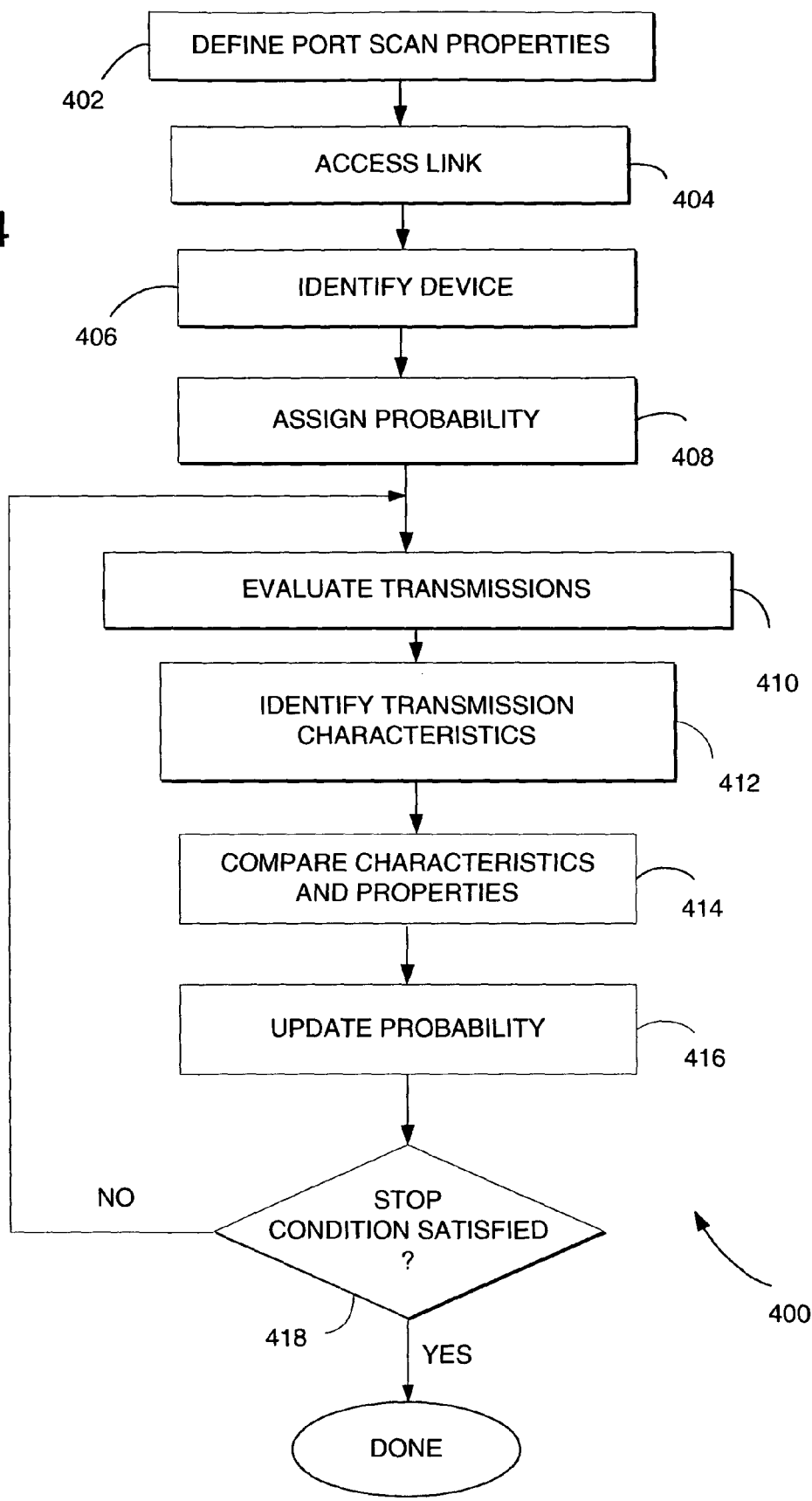
FIG. 4 illustrates a method in accordance with the present invention for detecting port scanning activities on a computer network.

FIG. 4 illustrates a method 400 for detecting port scanning activities on a network. At a step 402, the method 400 defines behavioral properties that indicate port scanning activities. Port scanners generally exhibit transmission patterns that are distinguishable from regular non-malicious network traffic. For example, port scanners often either attempt to access a large number of ports per destination address (vertical scanning) or attempt to access a few number of ports on a large number of destinations (horizontal scanning). As previously discussed, thresholds for port scanning may be assigned to these access patterns, and historical data from known port scanners may be used to define the port scan properties.

At a step 404, the method 400 accesses a data transmission link that transports a plurality of packets across the network. Any link transporting packets may be appropriate for use with the present invention. For example, the method 400 may tap a backbone of a high-speed transit network. As packets travel over the network, the method 400 may capture header information from the packets so as to record the source of the packets, as well as their destinations.

The method 400, at a step 406, utilizes the data from the transmission link to identify a selected source device on the network. For example, by reading the header information from the packets, an IP address may be identified as a source of numerous transmissions. While any source IP address may be selected, in one embodiment, only source devices exhibiting some suspicious behavior are selected at the step 406.

At a step 408, the method 400 assigns a probability variable to the selected source device. The probability variable indicates the probability that the selected source device is conducting port-scanning activities. A default initial probability may be assigned at the step 408, or the method 400 may use properties associated with the device in the assignment of the initial value of the probability variable.

The method 400 evaluates information describing transmissions emanating from the selected source device at a step 410. In one embodiment, the evaluated transmission data relates to each transmission emitted from the source during a selected length of time. For example, the information may reflect each transmission made during a 15 second interval. At a step 412, transmission characteristics associated with the observed transmissions are identified. While any characteristics may be identified, the characteristics may correspond to the various port scan properties. For example, the transmission characteristics may be the ratios associated with vertical or horizontal port scanning. As will be appreciated by those skilled in the art, any number of transmission characteristics may be identified at the step 412.

At a step 414, the method 400 compares the transmission characteristics to the port scanning behavior properties. Such a comparison may indicate whether or not the device conducted port-scanning operations during the time period. For example, one of the port scanning behavior properties may dictate a particular transmission characteristic that indicates port scanning. If the selected devices exhibited this characteristic during the time period it may be determined that the device was port scanning. Accordingly, the comparison of the step 414 may indicate whether or not the device was port scanning and/or provide an indication of the level of port scanning.

The method 400, at a step 416, utilizes the comparison of the step 414 to increase or decrease the probability variable. When the device acted like a scanner, the probability variable is increased to indicate a heightened probability that the device is a scanner. The level of increase may also consider a degree of scanning activity observed by the method 400. Further, the variable is decreased when the device did not exhibit scanner properties. Those skilled in the art will recognize that any number of algorithms, such as sequential hypothesis testing, may be used to update the probability variable.

At a step 418, the method 400 determines whether a stop condition is satisfied. A stop condition may be any circumstance where continued performance of the method 400 is unwarranted, and once such a condition is meet, performance of the method 400 is suspended. For example, after a maximum number of iterations it may be undesirable to continue considering whether the selected device is a scanner. As another example, once the probability variable reaches either a high or a low extreme, it may be determined that the device either is or is not a scanner.

When a stop condition is not satisfied, the method 400 repeats the steps 410-416. In one embodiment, each time the steps 410-416 are repeated, transmissions from a successive instance of the selected length of time are considered. For example, if the selected length of time is 15 minutes, the first performance of these steps may consider transmissions made from 12:00 to 12:15. In this case, the second iteration would consider transmissions between 12:15 and 12:30, while the third would consider transmission between 12:30 and 12:45. Accordingly, each transmission from 12:00 to 12:45 would be considered by the method 400, while no transmission would be considered multiple times. Of course, the selected length of time may be a much shorter intervals of time, such as 15 seconds. Those skilled in the art will appreciate that, by considering the activities of the selected device over multiple instances of the selected time period, a more accurate determination may be made as to whether the device is a port scanner. For example, the device may have appeared to be a port scanner after the first performance of the step 414. However, consideration of the device's behavior during five subsequent time periods may correctly indicate that the device is not a port scanner. Accordingly, the multiple performances of the method steps 410-416 minimize false positive indications of scanners and increase the accuracy of the method 400.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A computer implemented method for determining whether a device on a computer network is port scanning, the method comprising:
   assigning a probability variable to the device associated with said computer network, wherein said probability variable indicates the probability that said device is conducting port scanning activities;
   accessing transmission data describing one or more transmissions by said device during a plurality of time intervals;
   for each of said plurality of time intervals, computing a horizontal access pattern ratio and a vertical access pattern ratio for each of said plurality of time intervals;
   providing a port-scanning determination by determining whether said horizontal access pattern ratio exceeded a horizontal threshold value and whether said vertical access pattern ratio exceeded a vertical threshold value indicating port scanning behavior during each of said plurality of time intervals; and
   based on said port-scanning determination, updating said probability variable by utilizing a sequential hypothesis test that includes computing a ratio of said plurality of time intervals that said device behaved like a scanning device versus said plurality of time intervals that said device behaved like a benign device based on the number of times said horizontal access pattern ratio exceeded said horizontal threshold value and said vertical access pattern ratio exceeded said vertical threshold value.

2. The computer-implemented method of claim 1, wherein said device is identified by a source address associated with said one or more transmissions.

3. The computer-implemented method of claim 1, wherein said one or more threshold values includes at least one threshold value related a horizontal access pattern or at least one threshold value related a vertical access pattern.

4. The computer-implemented method of claim 1, wherein said computer network is a packet-based transit network.

5. The computer-implemented method of claim 1, wherein said accessing transmission data includes obtaining header information from a plurality of packets transmitted by said device over said computer network.

6. The computer-implemented method of claim 1, wherein said providing said port-scanning determination includes providing a value indicating a degree of port-scanning behavior.

7. One or more tangible computer-readable media having computer-useable instructions embodied thereon to perform the method of claim 1.

8. A computer-system for identifying devices operating on a transit network that exhibit behaviors of a port scanner, the computer-system comprising:
   a behavior analysis component stored on said computer-system and configured to generate behavior analysis indicating whether or not each of one or more devices on said transit network exhibited one or more behavioral characteristics of a port scanner during each of a plurality of time periods, wherein said behavior analysis includes computing a horizontal access pattern ratio and a vertical access pattern ratio for each of said plurality of time periods and determine whether said horizontal access pattern ratio exceeds a horizontal threshold value and whether said vertical access pattern ratio exceeds a vertical threshold value for each of said plurality of time periods; and
   a probability tracking component configured to receive said behavior analysis from said behavior analysis component and, for each of said plurality of time periods, to iteratively update a port scanner probability variable associated with each of said one or more devices based on a ratio of said plurality of time periods that said device behaved like a scanning device versus said plurality of time periods that said device behaved like a benign device based on the number of times said horizontal access pattern ratio exceeded said horizontal threshold value and said vertical access pattern ratio exceeded said vertical threshold value.

9. The system of claim 8, further comprising a packet sniffing component configured to interface with a link on said transit network and to collect data associated with a plurality of packets traversing said transit network.

10. The system of claim 9, wherein said link is a backbone of said transit network.

11. The system of claim 8, wherein at least a portion of said behavior analysis indicates a measure to which one of said one or more devices exhibited said one or more behavioral characteristics.

12. The system of claim 8, wherein said probability tracking component maintains a listing of devices with a high probability of being port scanners.

13. The system of claim 12, wherein said probability tracking component is configured to add a network device to said listing when said port scanner probability variable associated said network device reaches a defined upper bound.

14. A computer implemented method for detecting port scanning activities on a computer network, the method comprising:
- assigning a probability variable to a selected source device on said network, wherein said probability variable indicates the probability that said selected source device is conducting port scanning activities; and
- for each of a plurality of time periods, evaluating information describing one or more transmissions from said selected source device that were made during one of said plurality of time periods;
- identifying one or more transmission characteristics associated with the one or more transmissions, wherein said one or more transmission characteristics includes computing a horizontal access pattern ratio and a vertical access pattern ratio for each of said plurality of time periods;
- computing a probability ratio of said plurality of time periods that said device behaved like a scanning device versus said plurality of time periods that said device behaved like a benign device, wherein said probability ratio is based on the number of times said horizontal access pattern ratio exceeded a horizontal threshold value and the number of times said vertical access pattern ratio exceeded a vertical threshold value;
- providing a comparison of said one or more transmission characteristics to one or more behavioral properties that indicate port scanning activities;
- based on said probability ratio, updating said probability variable,
- determining that said selected source device is conducting port-scanning activities when said probability variable reaches a defined upper value, and
- determining that said selected source device is not conducting port-scanning activities when said probability variable reaches a defined lower value.

15. The computer-implemented method of claim 14, wherein each of said plurality of time periods is substantially the same length of time.

16. The computer-implemented method of claim 14, further comprising suspending performance of said method when said probability variable reaches said defined lower value or said defined upper value.

17. One or more tangible computer-readable media having computer-useable instructions embodied thereon to perform the method of claim 14.

* * * * *